United States Patent [19]
Krautkremer et al.

[11] Patent Number: 5,934,854
[45] Date of Patent: Aug. 10, 1999

[54] RING FASTENER, APPARATUS FOR INSTALLING SAME, AND INSTALLATION METHOD FOR THE RING FASTENER

[75] Inventors: Hubert Krautkremer, Mühlheim-Kärlich; Gerd Mayer, Gemmerich, both of Germany; René Straub, Holling, France

[73] Assignee: Lucas Industries public limited company, West Midlands, United Kingdom

[21] Appl. No.: 08/832,375

[22] Filed: Apr. 2, 1997

[51] Int. Cl.⁶ .............................. F16B 21/18; B25G 3/18
[52] U.S. Cl. ....................... 411/518; 411/353; 403/326
[58] Field of Search .................... 411/352, 353, 411/517, 518, 519; 403/326

[56] References Cited

U.S. PATENT DOCUMENTS

| 3,446,522 | 5/1969 | Hoard ............................ 411/518 X |
| 4,183,280 | 1/1980 | Hashimoto ....................... 411/518 |
| 4,568,059 | 2/1986 | Kawase et al. ................... 411/518 X |

FOREIGN PATENT DOCUMENTS

| 532373 | 10/1956 | Canada .......................... 411/518 |
| 873965 | 7/1942 | France .......................... 411/518 |
| A994526 | 11/1951 | France . |
| C638619 | 11/1936 | Germany . |
| 1251091 | 9/1967 | Germany . |
| 2620142 | 11/1978 | Germany . |
| 3635020 | 4/1987 | Germany . |
| A116568 | 10/1969 | United Kingdom . |

Primary Examiner—Neill Wilson
Attorney, Agent, or Firm—Wood, Herron & Evans, L.L.P.

[57] ABSTRACT

A ring fastener, with a circular configuration in the rest condition, comprising two ring ends (11, 12) spaced from each other, an essentially constant cross-section over at least 150° of its circumference, and in the area of each ring end (11, 12) a recess (13, 14) opening toward its inner circumference, enables an easy installation. A special apparatus enables a particularly effective installation of the ring fastener in very confined conditions.

20 Claims, 2 Drawing Sheets

RING FASTENER, APPARATUS FOR INSTALLING SAME, AND INSTALLATION METHOD FOR THE RING FASTENER

BACKGROUND OF THE INVENTION

The present invention relates to a ring fastener.

Such a ring fastener can be used, for example, to axially locate a stepped shaft in a bore. For this purpose wire rod retaining rings according to the state of the art are known (e.g. DE 26 20 142 C3). With such wire rod retaining rings for shafts or bores, respectively, which, in a locating groove of the shaft or the bore, respectively, in a radially compressed or radially expanded condition, respectively, enable the installation of a corresponding machine part by an axial slide on or insertion operation, respectively, this machine part can be retained axially located in a radially relieved condition and projecting into a catch slot. For this purpose, the ends of these wire rod retaining rings are bent to approx. 10% of the ring length in an inward direction for a shaft or in an outward direction, respectively, for a bore, in such a manner that the ends while holding the wire rod retaining ring essentially concentric to its locating groove, rest against the groove bottom.

From DE 36 35 020 C2 a lock ring made from spring wire is known which comprises inwardly angled ends. Such a lock ring is inserted in the expanded condition into a groove of a stop washer by sliding on so that its angled ends engage an axial recess of the stop washer. The so preassembled construction unit of the stop washer and the lock ring is inserted for installation into a cylindrical housing, with the lock ring being radially contracted to such an extent by means of a clamping tool applied at the angled ends that it completely disappears in the groove of the stop washer during the insertion operation. After the axially locating the preassembled construction unit, the lock ring re-expands radially so that it rests partly in the groove of the stop washer and partly in a circumferential groove of the cylindrical housing and thus axially locates the stop washer in the desired manner.

From DE 12 51 091 B2 a detachable connection of two housing components is disclosed, where the outer circumference of a cylindrical shoulder of the one housing component has an annular groove and the wall of a cylindrical recess of the other housing component accommodating the shoulder has an annular groove which forms a radial extension of the first annular groove. An oval annular body is arranged in both annular grooves, which in the disassembled condition has a circular shape with a diameter between the bottom diameters of the two annular grooves. In the installed condition the annular body is pressed into an oval shape by two screws offset by 180°, with the wall of the recess having an enlarged diameter enclosing the shoulder with a generous clearance. This detachable connection can absorb relatively high axial forces. However, its manufacture is relatively expensive, because the screw threads for the two clamping screws must be machined and the clamping screws must be installed in their threads.

Where higher requirements are to be met with respect to the absorption of axial forces and ease of installation, shaft lock rings punched from sheet metal are employed with holes provided in their ends for the application of a clamping tool.

Generally, such shaft lock rings have a cross-section which varies along the circumference of the shaft lock ring. The cross-section in the area of the ends is approximately identical to that in the centre area. The consequence of this is that such lock rings assume an oval shape in the compressed condition. This makes these rings unsuitable under very confined installation conditions.

In cases where such a shaft lock ring has to be installed in or removed from, respectively, the narrow gap between a shouldered shaft and a cylindrical bore, difficulties will be encountered insofar as the conventional assembly tongs tend to slip off the holes of the shaft lock ring. The same applies to shaft lock rings made from wire with bent ring ends. The shaft lock ring often has to be inserted several centimeters deep into the annular gap between the shouldered shaft and the cylindrical bore. This complicates its handling considerably. Finally, the shaft lock ring seated in the cicumferential groove has often engaged the circumferential groove of the bore to such a depth that the holes for tool application or the eyes formed in the angled ends, respectively, are partly hidden by the flanks of the annular groove. The consequence is that the tool can hardly or not at all grasp the shaft lock ring.

SUMMARY OF THE INVENTION

The invention is therefore based on the object to provide a ring fastener which enables easy assembly and disassembly.

To solve this object, a ring fastener with an approximately circular shape in its rest condition is provided, comprising two spaced ring ends, a cross-section being essentially constant over at least 150° of its circumference, and a recess in the area of each ring end, which opens into the inner circumference.

This enables a reliable engagement of a clamping tool in the recesses provided at the ring ends, where the recesses may extend so far into the ring area that the clamping tool can be inserted without problems. The cross-section being maintained constant over wide sections of the ring fastener effectively prevents the ring ends from submerging into an annular groove to a depth where a clamping tool can no longer engage the recesses.

A particularly surprising property of the ring fastener according to the invention is that the axial forces which can be absorbed by the ring fastener are higher than those of similar shaft lock rings.

Another unexpected effect of the ring fastener according to the invention is that it essentially retains its circular shape—with a smaller diameter—during contraction of the two ring ends.

In a preferred embodiment of the ring fastener the area of the essentially constant cross-section has a rectangular, square, round, or oval cross-section and is symmetrical to the ring ends.

In a preferred embodiment of the ring fastener the area with an essentially constant cross-section extends over up to 250°, preferably over approx. 202° of the circumference of the ring fastener. This enables a particularly easy assembly and disassembly of the ring fastener.

In an embodiment of the ring fastener, one recess each is arranged adjacent to both ends of the area with an essentially constant cross-section, which opens toward the outer circumference of the ring fastener. This enables the reliable grasping of the ring fastener in a compressed condition after it has been brought into this condition by a clamping tool.

In order to hold the ring fastener in its respective compressed condition as reliably and accurately as possible, it is advantageous that each of the recesses opening toward the outer circumference of the ring fastener includes an angle ranging from approx. 5° to 30°.

In a particularly preferred embodiment of the ring fastener each of the recesses opening toward the outer circumference of the ring fastener comprises a bottom which is offset eccentrically in an inward direction relative to the envelope of the ring fastener and has a convex, preferably approx. semi-circular shape. The eccentricity of the bottom can be defined such that a circle with with a smaller diameter than that of the envelope of the ring fastener is offset by approx. 1% to 10% of the diameter of the envelope of the ring fastener from the centre of the envelope of the ring fastener, preferably toward the constant cross-section area.

In order to prevent jamming or canting of the ring fastener during installation, flanks with rounded transitions are formed to the bottom of each of the recesses opening toward the outer circumference of the ring fastener.

In order to reliably retain the ring fastener in its compressed condition, the flank of each of the recesses opening toward the outer circumference of the ring fastener being closer to the respective ring end is preferably deeper than the flank being at a greater distance from the respective ring end.

Each of the recesses opening toward the outer circumference of the ring fastener takes up approx. 10% to 60% of the ring fastener cross-section.

To enable the compression of the ring ends as far as possible for a convenient placement of the ring fastener in its installation position, the ring ends in the rest condition of the ring fastener are preferably spaced from each other by an opening angle of 5° to 50°.

To facilitate the engangement of the clamping tool for a convenient disassambly also under confined conditions, the recesses opening toward the inner circumference have a convex, semi-circular bottom with adjoining straight flanks.

In order to be able to exert high clamping forces to the ring ends for compression or contraction of the ring fastener, each of the recesses opening toward the inner circumference has a centre axis directed away from the centre of the ring fastener.

The centre axis directed away from the centre of the ring fastener and the axis of symmetry of the ring fastener preferably include an angle of approx. 5° to 25°. This allows high clamping forces and simultaneously a reliable engagement of clamping tongs or a clamping apparatus even under confined conditions.

A further aspect of the invention relates to an apparatus for installing the above described ring fasteners. This apparatus comprises a holding means for a ring fastener the ring ends of which are at least partly compressed, and two projections extending from the holding means, each of which engages one of the recesses opening toward the outer circumference of the ring fastener.

This enables the above described ring fasteners to be simply and reliably installed even in a confined environment.

The holding means is preferably formed by a sleeve, the face of which approximately corresponds to the circumferential configuration of the ring fastener. The projections are arranged at this face.

In an ambodiment of the apparatus the holding means comprises at least one taper the cross-section of which has the shape of a circular section or a circular segment, and at which a sliding means is arranged. This sliding means enables a ring fastener arranged at the apparatus to be brought into its installed final position.

The holding means preferably comprises a first sliding means which in the area of the rings ends engages a ring fastener, and a second sliding means, which is arranged diametrically opposed to the first sliding means and which, in particular, can be actuated together with it. This allows the easy and rapid installation also of ring fasteners to be installed deep in a bore (if required by means of an automatic handling machine comprising this apparatus).

For the purpose of bringing a ring fastener by means of this apparatus into an annular groove arranged in the bore or behind a shoulder, each sliding means is movable in the longitudinal direction of the sleeve between a retracted position, in which it is set back relative to the holding means, and an advanced position, in which it extends beyond the projections.

According to a particularly preferred embodiment of the apparatus the sleeve is adapted for holding a component or an assembly to be secured by means of the ring fastener. If the sleeve accommodates the component or the assembly in a dimension-fitting manner, a rapid and reliable assembly can be achieved even with small tolerances.

According to still another aspect of the invention, the method for installing an above described ring fastener comprises the following steps: Contracting the ring ends, so that the ring fastener has a reduced diameter; maintaining the ring fastener at its reduced diameter; inserting the ring fastener into an opening up to a groove or a shoulder in the opening; releasing the ring fastener so that its diameter increases again and the ring fastener becomes seated in the groove or contacts the shoulder.

Preferably, the step of contracting the ring ends is effected by means of the recesses opening toward the inner circumference, and the step of retaining the ring fastener is effected by means of the recesses opening toward the outer circumference, with a projection each engaging the respective recess.

Finally, the step of releasing the ring fastener is preferably effected by displacing the ring fastener, so that the recesses clear the projections.

Further preferable embodiments, development and properties of the invention will be described in the following with reference to the drawings, in which:

DESCRIPTION OF THE PREFERRED EMBODIMENTS

Figure 1:
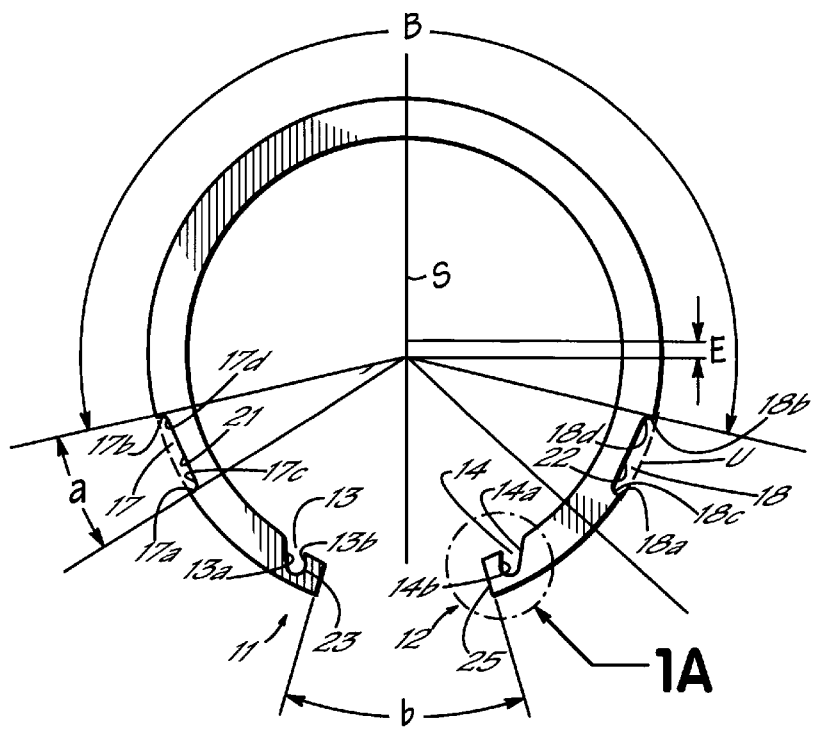
FIG. 1 shows a schematic top view of a ring fastener.
Figure 1A:
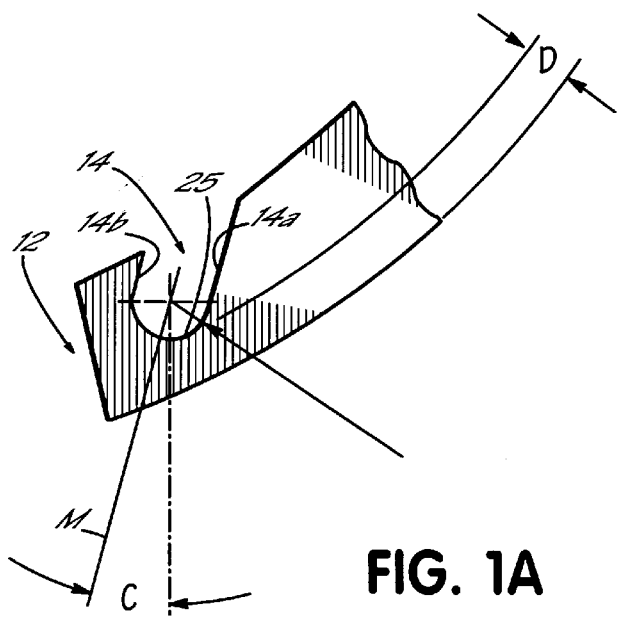
FIG. 1a shows a schematic enlarged top view of a section marked A in FIG. 1.

FIG. 1 shows a ring fastener punched from cold drawn and dry zinc-phosphated spring steel according to the invention, which in its rest position has an approximately circular configuration. The ring fastener comprises two ring ends 11, 12 spaced from each other and has an essentially constant cross-section over an area B of approx. 202°. This area B is arranged symmetrically with respect to the ring ends 11, 12 so that the ring fastener is also symmetric with respect to an axis of symmetry S of the ring fastener extending between the ring ends 11 and 12.

In the area of each ring end 11, 12 a recess 13, 14 opening toward the inner circumference of the ring fastener is arranged. These recesses 13, 14 are used for clamping the ring prior to its assembly. Adjacent to both ends of the area B with an essentially constant cross-section a recess 17, 18 opening toward the outer circumference of the ring fastener is arranged. These recesses 17, 18 include an angular range a of approx. 21°. The recesses 17, 18 comprise a bottom 21, 22 which is offset eccentrically relative to the envelope U of the ring fastener, which has a convex, preferably approx. semi-circular shape. Flanks 17a, 17b; 18a, 18b with rounded transitions 17c, 17c; 18c, 18d are formed to the bottom 21, 22 of each of the recesses opening toward the outside.

Due to the eccentricity of the bottom offset in an inward direction by a distance E toward the area B along the axis of symmetry S, the flank 17a, 18a of each of the recesses opening toward the outside being located nearer to the respective ring end 11, 12 is deeper than the flank 17b, 18b being at a greater distance from the respective ring end 11, 12. The recesses 17, 18 opening toward the outside reduce the cross-section of the ring fastener in the area of the flank 17b, 18b remote from the respective ring end 11, 12 by approx. one quarter, and in the area of the flank 17a, 18a nearer to the respective ring end 11, 12 by approx. one half.

In their rest condition, the ring ends 11, 12 are spaced by an opening angle b of approx. 30°.

The recesses 13, 14 opening toward the inner circumference comprise a semi-circular bottom 23, 25, both sides of which extend to straight parallel flanks 13a, 13b; 14a, 14b. The recesses 13, 14 opening toward the inside reach so far into the cross-section of the ring fastener that it is reduced to approx. 20% to 40%. at its thinnest point D of the ring end 11, 12. The recesses 13, 14 opening toward the inside are so oriented that their centre axis M is directed away from the centre of the ring fastener. The centre axis of the recesses 13, 14 and the axis of symmetry S of the ring fastener include an angle c of approx. 15°.

Figure 2:
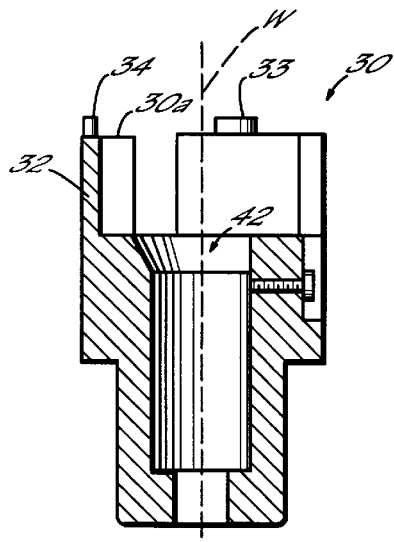
FIG. 2 is a schematic sectional view of an apparatus for assembling the ring fastener of FIG. 1.
Figure 3:
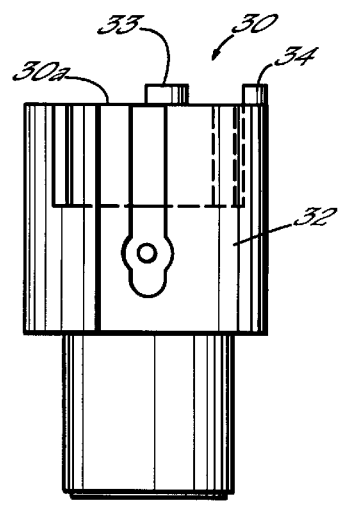
FIG. 3 is a side top view of the apparatus of FIG. 2.
Figure 4:
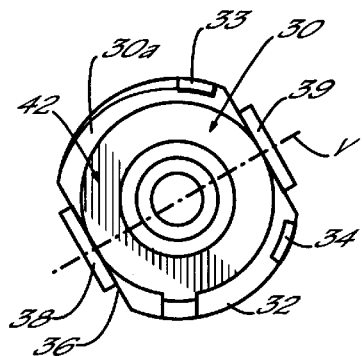
FIG. 4 shows the apparatus according to FIG. 3 viewed from above.

FIGS. 2 through 4 show an apparatus for assembling a previously described ring fastener. This apparatus comprises a holding means 30 for a ring fastener (not shown). The holding means 30 is formed by a face 30a of a tubular sleeve 32, with the face 30a of the sleeve 32 having a shape which has approximately the circumferential shape of the ring fastener, i.e. which has an essentially circular shape. At the face 30a two projections 33, 34 are arranged, the shape of which is so selected that, with the ring ends pressed together, they come into a from-fitting engagement with the recesses opening toward the outer circumference of the ring fastener. The projections 33, 34 are flush with the outside of the tubular sleeve 32.

The holding means 30 or the cylindrical sleeve 32, respectively, comprises two diametrically opposed tapers 36, 37 with the shape of a circular section (see FIG. 4), both of which are arranged at right angles to an axis of symmetry V extending between the two projections 33 and 34.

In each taper 36, 37 with the shape of a circular section a sliding means 38, 39 is arranged, the dimensions of which are so selected that is does not protrude beyond the circumference of the sleeve 32. The first sliding means 39 in the area of the ring ends between the projections 33, 34 acts on a ring fastener provided in the holding means 30. The second sliding means 38 acts on the continuous area of the ring fastener. The two sliding means 38, 39 can be actuated together by means of an actuation means (not shown) in such a manner that the two sliding means 38, 39 are movable in parallel to a longitudinal axis W (see FIG. 2) of the sleeve 32 between a retracted position, in which the sliding means 38, 39 are set back relative to the holding means 30 or the face 30a, respectively, and an advanced position, in which the sliding means 38, 39 extend beyond the projections 33, 34 in an axial direction.

The sleeve 32 comprises a hollow space 42 which is adapted for the dimension-fitting accomodation of a component to be secured by means of the ring fastener.

The method according to the invention for securing a component or an assembly by means of the above described ring fastener will be described below with reference to FIG. 5.

Figure 5:
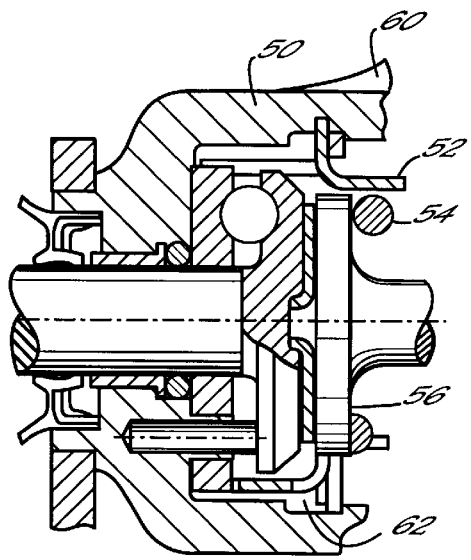
FIG. 5 shows a partial sectional view of a mechanic actuation means in which an assembly is installed by means of a ring fastener according to FIG. 1 using the apparatus according to FIGS. 2 through 4.

FIG. 5 shows a part of an otherwise not interesting mechanic actuation means, as it is disclosed, e.g. in EP 0 403 635 B1. A cylinder 50 contains a spring cage 52 for a spring 54, with the spring cage 52 and the spring 54 being illustrated in a very shortened manner only. The spring 54 acts on an actuation rod 56 which penetrates the spring cage 52.

For the installation of the spring cage 52 and the associated components in the cylinder 50, the spring cage 52 is preassembled with the other components to form an assembly. The ring fastener is contracted by means of clamping tongs, the fingers of which engage the recesses in the ring ends of the ring fastener, opening toward the inner circumference, and placed onto the holding means 30. Thereby the diameter of the ring fastener is reduced, but maintains its essentially circular shape. The projection 33, 34 at the face 30a of the sleeve 32 retain the reduced diameter of the ring fastener. Then the preassembled assembly with the spring cage is inserted into the hollow space 42 of the sleeve 32. The tool with the ring fastener and the assembly are then inserted into the cylinder 50 until the ring fastener 60 is level with a annular groove 62 formed into the inner wall of the cylinder 50. Then the two sliding means 38, 39 are moved from their retracted position into an advanced position. This causes the ring fastener to leave the holding means 30, and the recesses of the ring fastener opening toward the outside to come clear of the projections 33, 34. The ring fastener snaps back to its original shape with the larger diameter and engages the annular groove 62. This secures the spring cage 52 captively in the cylinder 50. Subsequently, the sleeve 32 is pulled out of the cylinder 50. This completes the installation operation.

For disassembly, the ring fastener is contracted by means of clamping tongs, the fingers of which engage the recesses opening toward the inner circumference of the ring fastener, so that its diameter is reduced. In this condition, the ring fastener can be pulled out of the annular groove 62 in the axial direction of the cylinder 50. This releases the assembly so that it can also be removed from the cylinder 50.

We claim:

1. A ring fastener, with
a circular configuration in the rest condition, comprising two ring ends (11, 12) spaced from each other,
an essentially constant diameter and cross-section (B) over an area of at least 150° of its circumference, and in the area of each ring end (11, 12) a recess (13, 14) opening toward its inner circumference,
wherein adjacent to the two ends of the area with the essentially constant cross-section (B) one recess (17, 18) each is arranged which opens toward the outer circumference of the ring fastener, characterized in that a flank (17a, 18a) of each of the recesses (17, 18)

opening toward the outer circumference of the ring fastener which is closer to the respective ring end (11, 12) is deeper than a flank (17b, 18b) which is at a greater distance from the respective ring end (11, 12).

2. A ring fastener according to claim 1, characterized in that the area with the essentially constant cross-section (B) is symmetrical to the ring ends (11, 12).

3. A ring fastener according to claim 1, characterized in that the area with the essentially constant cross-section (B) extends over up to 250° of the circumference of the ring fastener.

4. A ring fastener according to claim 1, characterized in that each of the recesses (17, 18) opening toward the outer circumference of the ring fastener includes an angular range (a) of approx. 5° to 30°.

5. A ring fastener according to claim 4, characterized in that the angular range (a) is approx. 21°.

6. A ring fastener according to claim 1, characterized in that each of the recesses (17, 18) opening toward the outer circumference of the ring fastener comprises a bottom (21, 22) eccentrically offset in an inward direction with respect to an envelope (U) of the ring fastener, which has a convex, preferably approx. semi-circular configuration.

7. A ring fastener according to claim 1, characterized in that adjacent to the bottom (21, 22) of each of the recesses (17, 18) opening toward the outer circumference of the ring fastener flanks (17a, 17b; 18a, 18b) of the recesses (17, 18) with rounded transitions (17c, 17d; 18c, 18d) are arranged.

8. A ring fastener according to claim 1, characterized in that each of the recesses (17, 18) opening toward the outer circumference of the ring fastener takes up approx. 10% to 60% of the cross-section of the ring fastener.

9. A ring fastener according to claim 1, characterized in that the ring ends (11, 12) are spaced from each other by an opening angle (b) of 5° to 50°.

10. A ring fastener according to claim 1, characterized in that the recesses (13, 14) opening toward the inner circumference have a convex, approx. semi-circular bottom (23, 25) with adjoining straight flanks (13a, 13b; 14a, 14b).

11. A ring fastener according to claim 10, characterized in that each of the recesses (13, 14) opening toward the inner circumference has a centre axis (M) directed away from the centre of the ring fastener.

12. A ring fastener according to claim 11, characterized in that the centre axis (M) directed away from the centre of the ring fastener and the axis of symmetry (S) of the ring fastener include an angle (c) of approx. 5° to 25°.

13. A method for the installation of a ring fastener, the ring fastener having a circular configuration in a rest condition, two ring ends (11, 12) spaced from each other, an essentially constant cross-section (B) over an area of at least 150° of its circumference, and in the area of each ring end (11, 12) a recess (13, 14) opening toward its inner circumference, wherein adjacent to the two ends of the area with the essentially constant cross-section (B) one recess (17, 18) each is arranged which opens toward the outer circumference of the ring fastener, characterized in that a flank (17a, 18a) of each of the recesses (17, 18) opening toward the outer circumference of the ring fastener which is closer to the respective ring end (11, 12) is deeper than a flank (17b, 18b) which is at a greater distance from the respective ring end (11, 12), further characterized by a holding means (30) for the ring fastener, the ring ends of which are at least partly compressed, and two projections (33, 34) protruding from the holding means, each of which engages one of the recesses (17, 18) opening toward the outer circumference of the ring fastener.

14. A method for the installation of a ring fastener according to claim 13, characterized in that the holding means (30) is formed by a sleeve (32) of the approximate circumferential configuration of the ring fastener, where at a face (30a) the projections (33, 34) are arranged.

15. A method for the installation of a ring fastener according to claim 14, characterized in that the holding means (30) comprises at least one taper (16, 17) the cross-section of which has the shape of a circular section or a circular segment, at which a sliding means (38, 39) is arranged.

16. A method for the installation of a ring fastener according to claim 15, characterized in that the holding means (30) comprises a first sliding means (39) which in the area of the ring ends engages a ring fastener, and preferably a second sliding means (38), which is arranged diametrically opposed to the first sliding means (39) and which, in particular, can be actuated together with it.

17. A method for the installation of a ring fastener according to claim 15, characterized in that each sliding means (38, 39) can be moved in the longitudinal direction of the sleeve (32) between a retracted position where it is set back relative to the holding means (30) and an advanced position where it protrudes beyond the projections (33, 34).

18. A method for the installation of a ring fastener according to claim 14, characterized in that the sleeve (32) is adapted for the insertion of a component or an assembly to be secured by means of the ring fastener.

19. A method for the installation of a ring fastener, comprising:

a) contracting ends of the ring so that the ring fastener has a reduced diameter, b) maintaining the ring fastener at its reduced diameter;

c) inserting the ring fastener into an opening up to a groove or a shoulder in the opening;

d) releasing the ring fastener so that its diameter increases again and the ring fastener becomes seated in the groove or contacts the shoulder, and wherein b1) the step b) of retaining the ring fastener is effected by means of recesses (17, 18) in the ring fastener opening toward the outer circumference, with two projections protruding from a holding means (30) each engaging one of the recesses.

20. A method for the installation of a ring fastener according to claim 19, wherein d) the step d) of releasing the ring fastener is preferably effected by displacing the ring fastener, so that the recesses clear the projections.

* * * * *

UNITED STATES PATENT AND TRADEMARK OFFICE
CERTIFICATE OF CORRECTION

PATENT NO. : 5,934,854
DATED : August 19, 1999
INVENTOR(S) : Hubert Krautkremer, Gerd Mayer and Rene Straub It is certified that error appears in the above-identified patent and that said Letters Patent is hereby corrected as shown below:

Column 1,
Before line 5, insert the following: -- This application is a continuation of PCT application number PCT/EP95/0 4074, filed October 17, 1995. --

Signed and Sealed this

Twelfth Day of October, 2004

JON W. DUDAS
*Director of the United States Patent and Trademark Office*

UNITED STATES PATENT AND TRADEMARK OFFICE
CERTIFICATE OF CORRECTION

PATENT NO.    : 5,934,854                                              Page 1 of 1
DATED         : August 10, 1999
INVENTOR(S)   : Hubert Krautkremer, Gerd Mayer and Rene Straub It is certified that error appears in the above-identified patent and that said Letters Patent is hereby corrected as shown below:

<u>Title page,</u>
Insert Item -- [30] Foreign Application Priority Data
    Oct. 24, 1994  [DE] Germany.....P 44 37 967.6 --.

Signed and Sealed this

Sixteenth Day of May, 2006

JON W. DUDAS
*Director of the United States Patent and Trademark Office*

UNITED STATES PATENT AND TRADEMARK OFFICE
CERTIFICATE OF CORRECTION

PATENT NO. : 5,934,854  Page 1 of 1
DATED : August 10, 1999
INVENTOR(S) : Hubert Krautkremer, Gerd Mayer and Rene Straub It is certified that error appears in the above-identified patent and that said Letters Patent is hereby corrected as shown below:

<u>Title page,</u>
Insert Item -- [30]   Foreign Application Priority Data
             Oct. 24, 1994   [DE]   Germany............P 44 37 967.6 --.

Signed and Sealed this

Thirtieth Day of May, 2006

JON W. DUDAS
*Director of the United States Patent and Trademark Office*